No. 731,632. PATENTED JUNE 23, 1903.
W. H. TOMSON & W. G. HANNA.
APPARATUS FOR CASTING BEARINGS.
APPLICATION FILED MAR. 21, 1903.
NO MODEL. 5 SHEETS—SHEET 1.
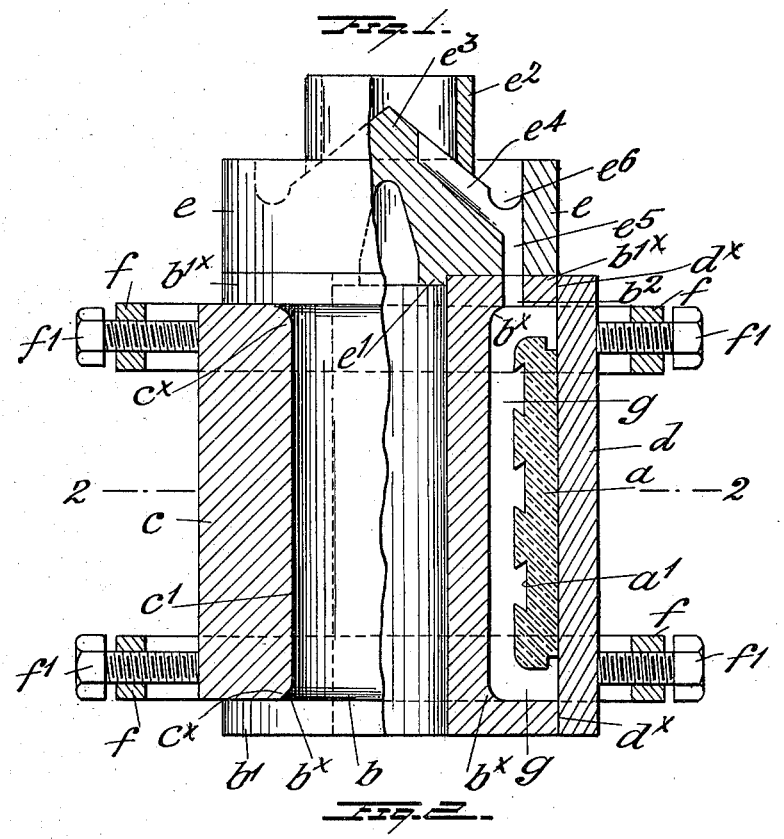
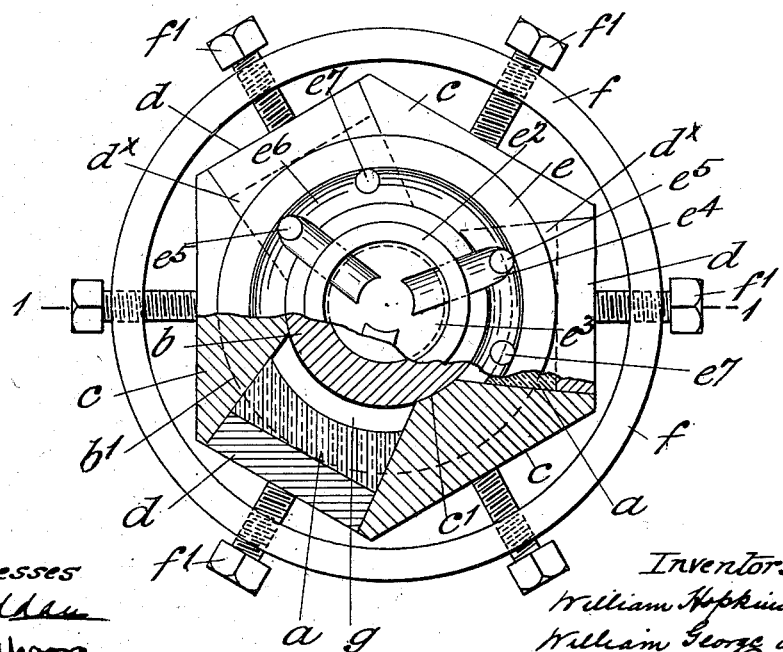

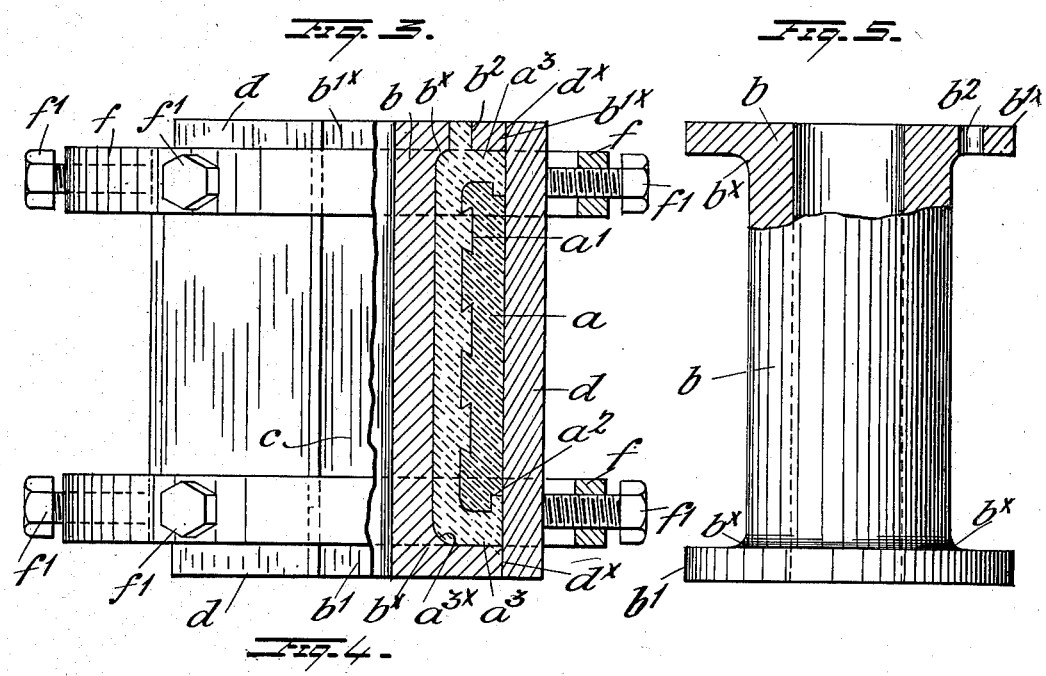
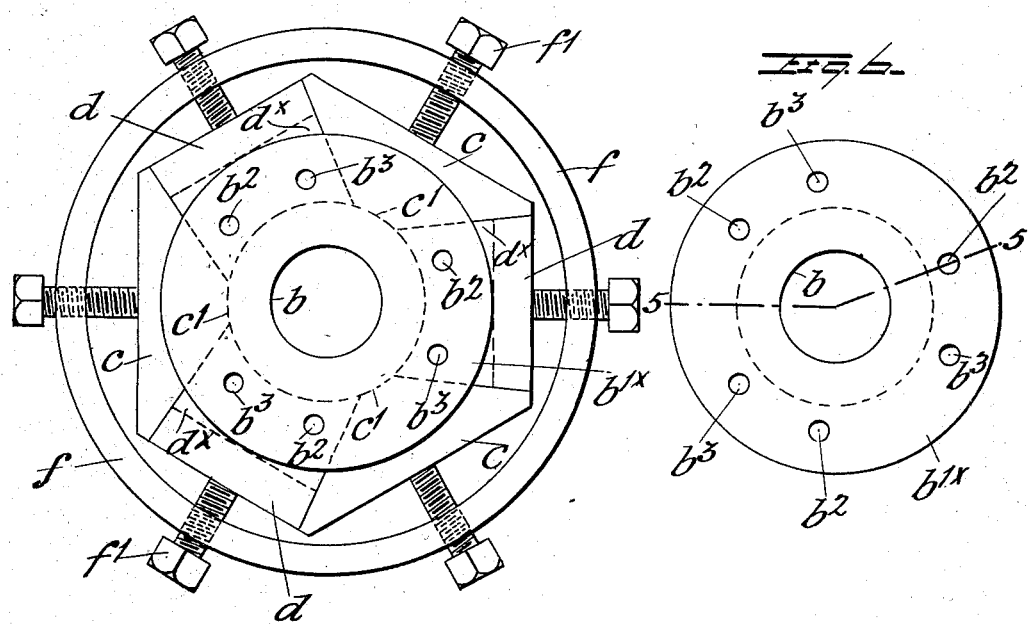

No. 731,632. PATENTED JUNE 23, 1903.
W. H. TOMSON & W. G. HANNA.
APPARATUS FOR CASTING BEARINGS.
APPLICATION FILED MAR. 21, 1903.
NO MODEL. 5 SHEETS—SHEET 3.
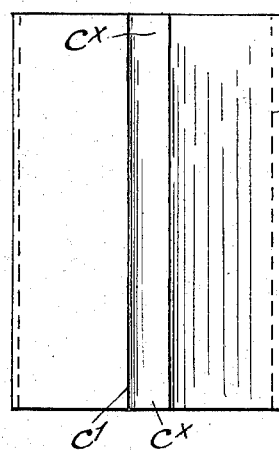
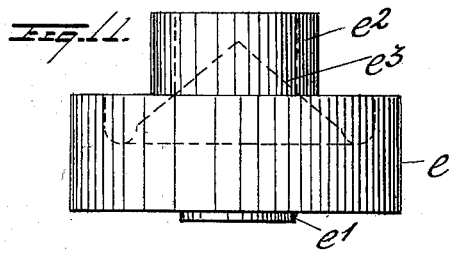
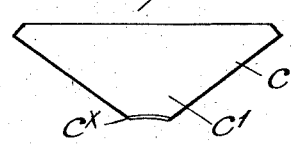
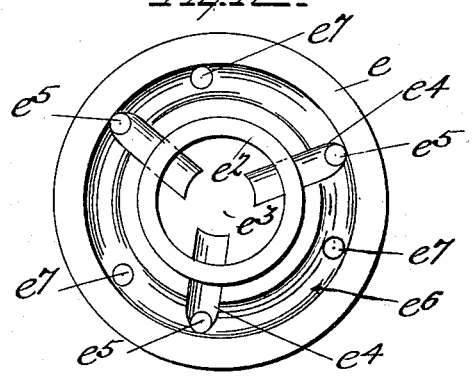
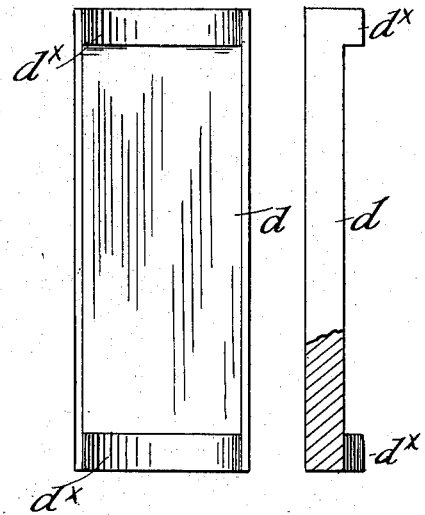
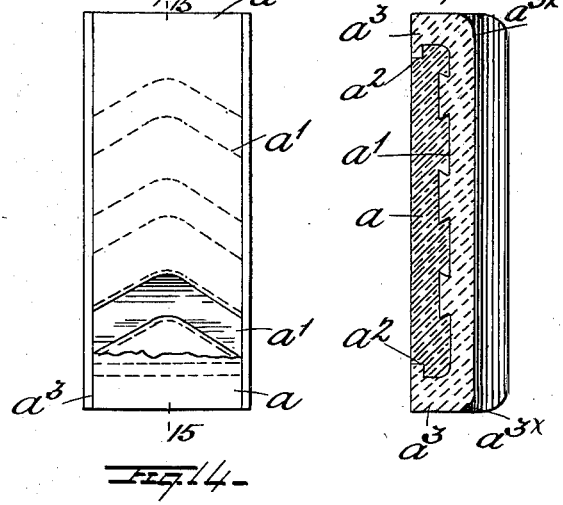
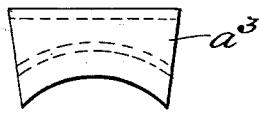
Witnesses
Inventors
William Hopkins Tomson
William George Hanna
By their Attorney No. 731,632. PATENTED JUNE 23, 1903.
W. H. TOMSON & W. G. HANNA.
APPARATUS FOR CASTING BEARINGS.
APPLICATION FILED MAR. 21, 1903.
NO MODEL. 5 SHEETS—SHEET 4.
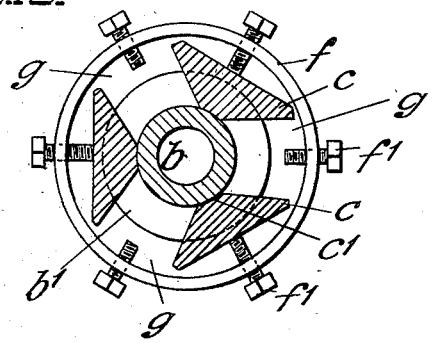
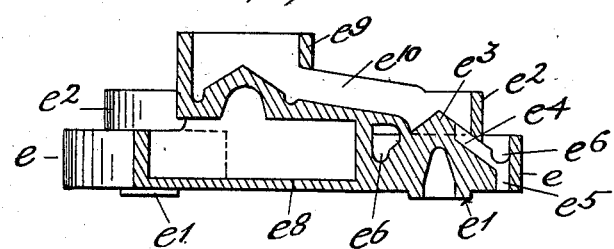
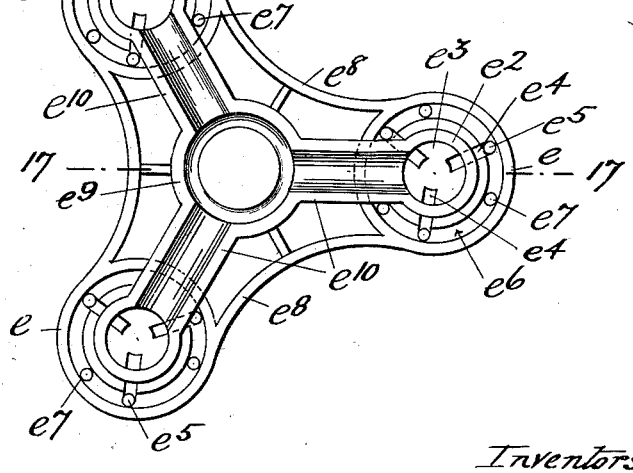

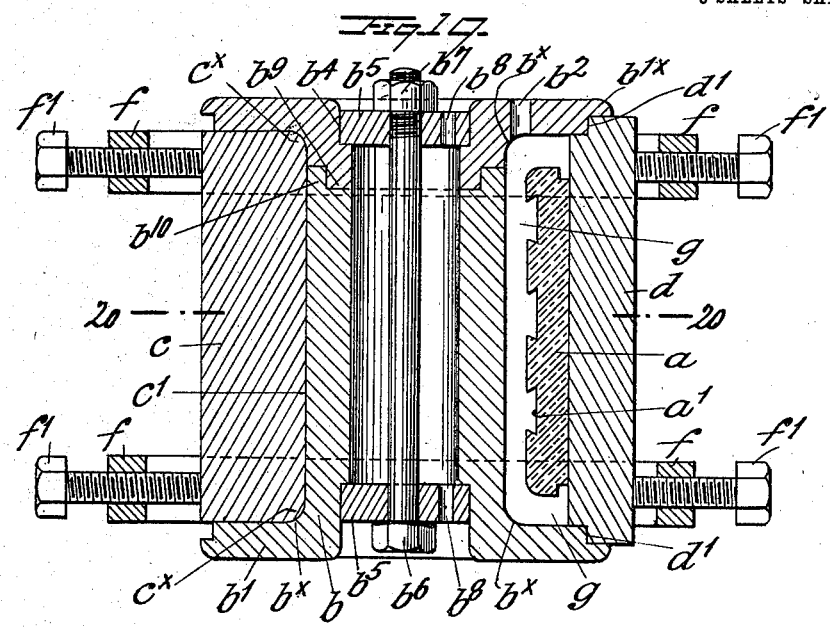
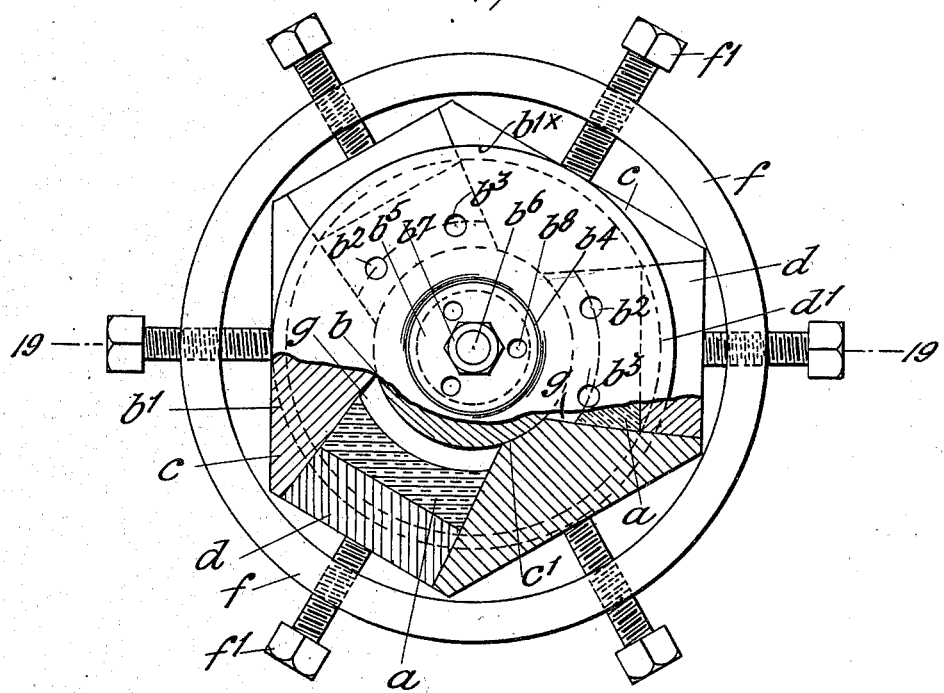

No. 731,632. Patented June 23, 1903.

UNITED STATES PATENT OFFICE.

WILLIAM HOPKINS TOMSON, OF LONDON, ENGLAND, AND WILLIAM GEORGE HANNA, OF GLASGOW, SCOTLAND.

APPARATUS FOR CASTING BEARINGS.

SPECIFICATION forming part of Letters Patent No. 731,632, dated June 23, 1903.

Application filed March 21, 1903. Serial No. 148,999. (No model.)

*To all whom it may concern:*

Be it known that we, WILLIAM HOPKINS TOMSON, of the firm of Charles Hatton & Co., residing in London, England, and WILLIAM GEORGE HANNA, residing in Glasgow, Scotland, subjects of the King of England, have invented certain new and useful Improvements in the Manufacture of Shaft or Axle Bearings, of which the following is a specification.

The invention relates to improvements in or connected with the manufacture of brasses or bushes for the bearings of shafts, axles, or the like, more especially applicable to railway and tramway rolling-stock, locomotive-engines, and motors.

The usual method of producing brasses or bushes for bearings consists in first casting them approximately to the size and shape required and then boring or turning the faces thereof to fit the diameter of the shaft-axle or the like in connection with which they are to be employed, and this method is adopted whether or not the brasses or bushes are wholly or partly faced or lined with Babbitt or other antifriction metal. Cutting into the surface of the cast antifriction or other metal in this manner besides adding to the cost of manufacture destroys the skin thereof, opens the pores of the metal, and increases its frictional resistance to the revolving shaft-axle or the like.

The object of the present invention is primarily to dispense with the necessity for boring or turning and to cast the brasses or bushes for bearings, whether the bearing-faces are partially or entirely coated or lined with antifriction metal or not, to exactly fit the diameter of and ready for immediate application to the shaft, axle, or the like and the bearing or box in connection with which they are to be used and in such manner that they will present a perfectly unbroken and smooth skin or bearing-surface, so that the frictional resistance of said bearing-surfaces will be lessened and the texture of the metal will at the same time be condensed or consolidated and the durability, and consequently the commercial value, of the brasses or bushes will be much improved.

A further object of the invention is to produce by casting in one operation several bearings ready for use without boring or turning.

A further object of the invention is to produce by casting in one operation several bearings each of which shall consist of or be faced with dense metal of equal homogeneity.

A further object of the invention is to provide apparatus for carrying the above-recited objects into effect.

In order that the said invention may be clearly understood and readily carried into effect, we will proceed, aided by the accompanying drawings, fully to describe the same.

In the said drawings, Figure 1 is a vertical section taken on the line 1 1 of Fig. 2, some parts being shown in elevation, illustrating an apparatus for carrying into effect the present invention, with a base or body of a brass or bush in position therein ready for the casting or lining operation. Fig. 2 is a plan or top view thereof, partly in section, said section being taken on the line 2 2 of Fig. 1. Fig. 3 is a sectional elevation of the apparatus after the casting or lining operation and with the pouring-block removed. Fig. 4 is a plan or top view thereof. Fig. 5 is an elevation partly in section, the section being taken on the line 5 5 of Fig. 6 of the cylindrical central part of the apparatus or mold separately. Fig. 6 is a plan or top view thereof. Fig. 7 is an inside face view or elevation of one of the distance-pieces separately. Fig. 8 is a plan or end view thereof. Fig. 9 is an inside face view of one of the backing or covering plates separately. Fig. 10 is a plan or end view thereof. Fig. 10ª is a side or edge view thereof, partly in section. Fig. 11 is an elevation of the pouring-block separately. Fig. 12 is a plan thereof. Fig. 13 is a face view with part of the lining or facing metal broken away, illustrating one kind of brass or body of bush for a bearing to be lined with antifriction metal in the apparatus. Fig. 14 is an end view thereof when lined or faced. Fig. 15 is a longitudinal section taken on the line 15 15 of Fig. 13. Fig. 16 is a horizontal section of the apparatus with certain parts removed. Fig. 17 is a vertical section taken on the line 17 17 of Fig. 18 of a multiple pouring-block. Fig. 18 is a plan thereof. Fig. 19 is a vertical section taken on the line 19 19 of Fig. 20, illustrating slight modifications in the constructive details of the casting apparatus, and Fig. 20 is a plan or top view thereof, partly in section, being taken on the line 20 20 of Fig. 19.

In the several figures like parts are indicated by similar letters of reference, and Figs. 16 to 18 are drawn to a reduced scale with respect to the other figures of the drawings.

Referring to Figs. 1 to 16, $a$ represents a body or skeleton base of a bush or bearing, and the face of this base is formed with approximately transverse undercut grooves $a'$ of a suitable shape, such as a flattened V shape, and the ends thereof are provided with undercut grooves $a^2$, so that the face and ends are adapted to be covered with and to hold in place a facing or lining $a^3$, preferably of antifriction metal.

Several bodies or bases $a$, grooved in the manner described, are placed in a casting apparatus of the following construction and the antifriction-metal coating or lining $a^3$ is applied in the following manner. The apparatus is preferably constructed to accommodate three bodies or bases $a$ and is so illustrated in the drawings, and that arrangement will now be described.

$b$ represents the central part of the apparatus, which consists of a hollow cylinder of iron or other suitable material, at its ends formed with flanges $b'$ $b'^\times$, the ends of the cylinder $b$ at its point of connection $b^\times$ with the flanges $b'$ $b'^\times$ being outwardly curved to give the required radius or rounding at $a^{3\times}$ to the antifriction-metal facing or lining of the brass or bush; but it will be understood that this shape will necessarily be varied with the shape of the bearing required and to fit the axle-shaft or the like to which the brass or bush is to be applied.

The cylindrical center $b$, which should have a highly-polished surface, is formed of a diameter equal to that of the shaft-axle or the like with which the finished brass bush or lining is intended to be used and is designed to form and give an extremely smooth skin to the face of the lining or bearing-surface $a^3$, while the flanges $b'$ $b'^\times$ are arranged at a distance apart equal to the length of the finished bush with its coating or lining $a^3$ of the antifriction metal, and are designed to form or shape the ends thereof.

Arranged around the cylinder $b$, at equal distances apart, are three filling or distance pieces $c$, each having triangular transverse section, and these distance-pieces $c$ are arranged with their truncated apices $c'$ toward the surface or periphery of the cylindrical central part $b$, and said apices are curved to closely fit said surface, while at their ends they are shaped to fit between the flanges $b'$ $b'^\times$ of the cylindrical central part $b$ and are rounded at $c^\times$ to fit the radius or rounding $b^\times$ thereof.

The distance-pieces $c$ are so shaped that when in position around the cylindrical central part $b$ opposite sides of adjacent filling-pieces are approximately parallel, but gradually approach one another toward the cylindrical central part $b$, thus forming or leaving between them slightly-tapered recesses or spaces $g$, as shown more particularly at Fig. 16. In each of these recesses or spaces between the distance-pieces $c$ is placed a skeleton base or body of a bush or bearing formed with dovetailed or other key-cut grooves, as hereinbefore described, and such body or base $a$ is of a width and is at its sides tapered or shaped to fit into the recess or spaces $g$ between two consecutive distance-pieces $c$.

Each body or base $a$ is in the example given of a length considerably less than the distance between the flanges $b'$ $b'^\times$ of the cylindrical center $b$, and it is by its close fit or it might be otherwise held in a central or it might be any other suitable position with relation to the length of the recess and also at a suitable distance from the surface or periphery of the cylindrical center, and thus a space is left, as shown more particularly at Figs. 1 and 2, between the face of the body or base of bush or bearing to be lined and the surface or periphery of the cylindrical central part $b$ and the ends of the body or base $a$ and the flanges $b'$ $b'^\times$ of the cylindrical center $b$ to receive the metal necessary to form the lining or covering $a^3$ of said body $a$.

A covering or backing plate $d$, shaped to fit the recess or space between the distance-pieces $c$ back of body $a$ and curved at $d^\times$ to the radius of, so as to fit against the flanges $b'$ $b'^\times$ of the cylinder $b$, is placed over each body $a$, although this may in some cases be dispensed with and these backing-plates $d$ and the distance-pieces $c$ are fastened in position by suitable means, such as rings $f$, surrounding the entire device and furnished with set or adjusting screws $f'$, some of which bear upon the backing-plates $d$ and others upon the distance-pieces $c$.

The meeting faces of the several parts, such as the cylindrical central part $b$, the distance-pieces $c$, and the backing-plates $d$, are faced by turning, planing, or otherwise and shaped in such manner as to fit together as nearly as possible in a fluid-tight manner.

In the flange $b'^\times$ at one end of the cylindrical center $b$ approximately opposite each of the spaces $g$ between the body or base $a$ and the surface or periphery of the cylindrical central part $b$ are formed holes $b^2$ $b^3$, the one, $b^2$, of each pair of holes to serve as a pouring-hole for the metal $a^3$ in the operation of casting the same upon the body $a$ and the other, $b^3$, as an air hole or vent.

The apparatus built up in the manner hereinbefore described with the several bases or bodies $a$ in position therein is placed on end, as shown at Figs. 1 and 2, in readiness for the casting operation and is by means of a furnace or otherwise heated to a suitable temperature—about 250° Fahrenheit, for example—prior to the pouring of the fluid antifriction metal thereinto.

The pouring of the antifriction metal is effected by means of a device $e$, which may be termed a "pouring-block," and which is constructed in the following manner: This pouring-block, which is preferably circular in shape, as shown in the drawings, is formed with a base $e$, adapted to rest upon that flange $b'^{\times}$ of the cylindrical central part $b$ of the apparatus provided with the holes $b^2$ $b^3$, and upon the under side of the base $e$ of the pouring-block and concentrically therewith is formed a cylindrical projection or spigot $e'$ of a diameter to fit easily the central hollow or bore of the cylindrical central part $b$, so as to centralize the pouring-block with relation to the apparatus.

Upon the upper side of the base $e$ of the pouring-block is formed a hollow projection $e^2$, forming a well of smaller diameter than the base $e$, into which the fluid antifriction or other metal is poured from a ladle or the like, and the bottom $e^3$ of this well rises in the form of a cone, and in the face of the cone $e^3$, commencing at a suitable distance from the apex thereof, are formed inclined open channels $e^4$, which extend beneath the wall of the well $e^2$ into the base $e$, where they communicate with holes or ways $e^5$, formed vertically through the base $e$ and spaced to register with the pouring-holes $b^2$ of the flange $b'^{\times}$ of the cylindrical part $b$.

In the base $e$, around the well $e^2$, is formed a gutter $e^6$, into which the several holes or ways $e^5$ open, and in suitable positions in the base $e$ are formed vertical airways $e^7$, which at their upper ends communicate with the gutter $e^6$ and at their lower ends register with the corresponding air-holes $b^3$, formed in the flange $b'^{\times}$ of the cylindrical center part $b$.

The pouring-block $e$ prior to the pouring of the antifriction metal is separately heated in a furnace or other suitable means to a very high temperature—about 900° Fahrenheit, for example—so as to maintain the metal passing therethrough in a thoroughly fluid condition, and it is then placed in position upon the apparatus, as shown in Fig. 1. The fluid metal is then poured into the well $e^2$ by means of a ladle or otherwise and is divided by the conical bottom $e^3$, so that it flows in equal volume, or nearly so, into the several channels $e^4$, and is thereby conveyed to the ways $e^5$, by which and the holes $b^2$ of the flange $b'^{\times}$ of the cylindrical central part $b$ it is conducted into the spaces $g$ of the apparatus.

It is desirable that the metal poured into the well $e^2$ of the pouring-block be in excess of that actually required to form the linings or facings of the brasses or bushes, and the surplus metal will overflow from the spaces $g$ by the ways $b^2$ $b^3$ $e^5$ $e^7$ into the gutter $e^6$, thereby producing a head of fluid metal, and from the gutter $e^6$ it may be subsequently removed in a clean condition and saved for future use instead of being wasted.

By the employment of the pouring-block $e$ the fluid metal is run into the several spaces $g$ of the apparatus simultaneously and cast under equal conditions therein, consequently insuring equality of the castings, while the use of the well $e^2$ enables the metal to be poured from a considerable height without spilling and a head of fluid metal is obtained, and by reason of this fact and the highly-heated condition of the pouring-block $e$ the metal passes into the spaces $g$ of the apparatus in an extremely fluid condition and with considerable velocity and pressure, and the antifriction-metal face cast upon the bases or bodies $a$ is thereby condensed or solidified and formed of a very close texture throughout and with its skin or bearing-surface in perfect condition for immediate use, while at the same time it is caused to more closely attach itself to the body $a$ than heretofore.

It will be understood that when it is desired to form brasses or bushes entirely of one metal—for example, gun-metal or the like—that is to say, without a facing or lining of some other metal, such as antifriction metal—the bases or bodies $a$ are not required in the apparatus, but are omitted, and fluid gun-metal or the like is run into the free spaces of the apparatus instead of antifriction metal.

In the example given at Figs. 17 and 18 is shown a multiple pouring-block adapted to be used in connection with three built-up casting apparatuses of the character hereinbefore described at the same time. In this case the bases $e$ are connected by a frame $e^8$, and a central well $e^9$, of similar construction to that of $e^2$, is provided, into which the metal is poured, and this central well $e^9$ is connected with the wells $e^2$ by gutter-like ducts $e^{10}$.

In the example given at Figs. 19 and 20 some of the constructive details of the casting apparatus apart from the pouring-block are slightly modified, more especially with the object of facilitating the assembling of the several parts. For this purpose the cylindrical central part $b$ at a point below the flange $b'^{\times}$ is transversely divided into two parts, which are separately connected by means of a bolt $b^6$ passing through perforations in disks $b^5$, furnished with air-holes $b^8$ and fitting into countersunk or shouldered recesses $b^4$, formed in each end of the bore of the cylindrical central part $b$, so that by screwing up the nut $b^7$ the two parts of the cylindrical central part $b$ can be securely connected together or by unscrewing said nut disconnected. The upper part of the cylindrical central part $b$ is formed with a spigot-like projection $b^9$, and the lower part thereof is formed with a corresponding recess $b^{10}$ to receive the same, by which means said parts are kept in alinement. In assembling or adjusting the several parts of the casting apparatus according to this modified construction the flange $b'^x$ of the cylindrical central part $b$ is removed, when the several parts will be fully exposed to view and can be readily adjusted in the desired manner. The end flanges $b'$ are also shown recessed and shouldered, as at $d'$, to fit corresponding recesses and shoulders on the plates $d$. It will be evident that this multiple pouring-block may by modifying the number of wells $e^2$ and its general shape be constructed to act in connection with any desired number of built-up casting apparatus arranged in a right line or in other suitable manner.

Although the invention as hereinbefore shown and described is primarily intended to be employed in connection with the manufacture of brasses or bushes faced or lined with antifriction metal, it will be understood that it may be employed for casting in gun or other suitable metal or partly of one kind and partly of another or other brasses or bushes unfaced with antifriction metal and ready for immediate use, and although the apparatus as shown and described is arranged for the manufacture of three castings simultaneously it may by slightly modifying the shapes, proportions, or arrangement of the parts be constructed to cast one, two, or other number of bushes and whether partly or entirely coated with antifriction metal or not.

It will be obvious that by modifying the shape of the parts other shaped brasses or bushes than those hereinbefore described may be cast in the apparatus, and it will also be evident that the details of construction of the apparatus may be considerably modified without departing from the spirit of the invention.

We are aware that it is well known to pour antifrictional metal into bearings while the journals are *in situ* therein in order to form a liner, and we do not claim this broadly; but We declare that what we claim is—

1. In apparatus for casting or lining by casting the bodies of brasses or bushes for bearings the combination of a flanged cylindrical central part having externally the shape to be given to the face of the finished brass or bush and having pouring and vent holes formed in one of the flanges thereof, distance-pieces fitting the face and flanges of the cylindrical central part and arranged in position around the same so as to leave spaces between them, means for removably holding the distance-pieces in position, backing-plates closing said spaces and means for removably holding said backing-plates in position substantially as herein shown and described and for the purpose stated.

2. In apparatus for casting or lining by casting the bodies of brasses or bushes for bearings, the combination of a flanged cylindrical central part having a diameter equal to that of the shaft or axle with which the bushes are to be used, distance-pieces of triangular section arranged at intervals in equidistant positions around the cylindrical central part and shaped to closely fit the face and flanges thereof, backing-plates closing said spaces and means for removably holding the filling-pieces and backing-plates in position substantially as herein shown and described and for the purpose stated.

3. In apparatus for lining by casting the bodies of brasses or bushes for bearings the combination of a flanged cylindrical central part having a diameter equal to that of the shaft or axle with which the bushes are to be used and having pouring and air holes in one flange thereof, distance-pieces arranged at intervals in equidistant positions around the cylindrical part and shaped to closely fit the face and flanges thereof thereby forming spaces between said distance-pieces adapted to receive the body or base of a bush to be lined and means for removably holding the distance-pieces and bodies or bases in position substantially as herein shown and described and for the purpose stated.

4. In apparatus for casting or lining by casting the bodies of brasses or bushings for bearings, the combination of a flanged cylindrical central part divided transversely of the axis into two portions, one of the flanges having pouring and vent holes, bolt and nut for connecting said portions, distance-pieces fitting the periphery and flanges of the cylindrical central part and arranged in position around the same so as to leave spaces between them, backing-plates closing said recesses, means for removably holding the distance-pieces and backing-plates in position as herein shown and described and for the purpose stated.

5. In apparatus for casting or lining by casting the bodies of brasses or bushes for bearings, a multiple mold having pouring and vent holes at the end of each compartment of the mold in combination with a pouring-block consisting of a base adapted to seat upon the mold and having holes adapted to register with the pouring and vent holes of the mold, a central well upon said base formed with a conical bottom, channels formed in the conical bottom and leading beneath the wall of the well to the pouring-holes of the base and an annular gutter surrounding the well and connecting with the pouring and vent holes of the base substantially as herein shown and described and for the purpose stated.

6. In apparatus for producing journal-bearings the combination of a central cylinder, a plurality of skeleton bearing-bases and a plurality of intervening distance-pieces assembled to constitute a multiple casting-mold the bearing-bases being so shaped and disposed as to become integrally connected severally with the castings.

7. In apparatus for manufacturing bushes or bearings or for lining the bodies of bushes or bearings with antifriction or other metal, the combination of a plurality of multiple molds and a removable pouring-block having a central well, a plurality of secondary wells, channels leading from the primary well to the secondary wells respectively, and channels from said secondary wells to the compartments respectively of the corresponding multiple mold, as herein shown and described and for the purpose stated.

In witness whereof we have signed this specification in the presence of two witnesses.

WILLIAM HOPKINS TOMSON.
WILLIAM GEORGE HANNA.

Witnesses:
WALTER E. ROCHE,
A. E. HATHAWAY.